Patented Dec. 23, 1930

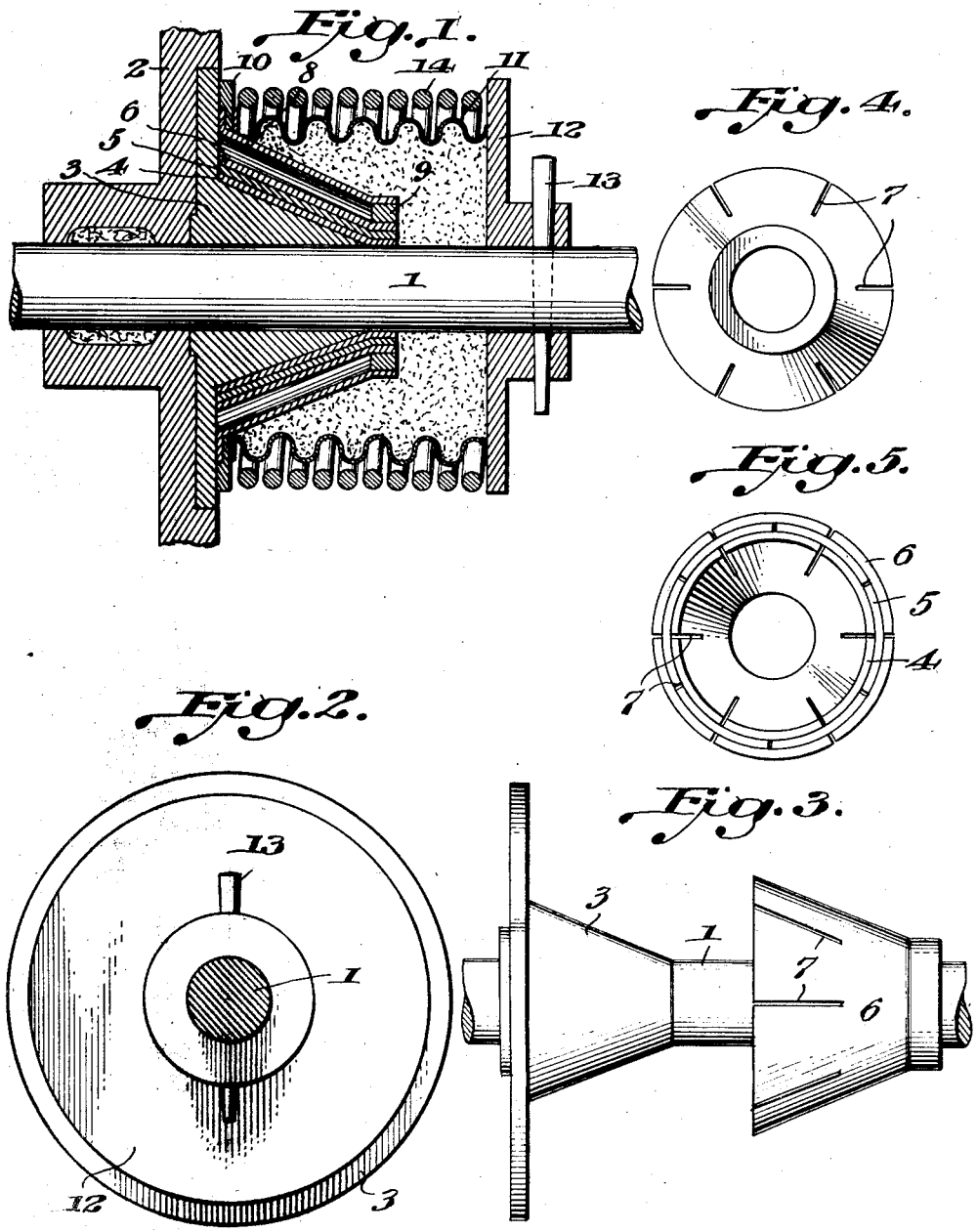

1,785,806

UNITED STATES PATENT OFFICE

ALBEON BEASLEY, OF EVANSVILLE, INDIANA, ASSIGNOR OF ONE-HALF TO WILLIAM SHIRLEY JACO, OF VANDERBURG COUNTY, INDIANA; RUSSELL COFFMAN ADMINISTRATOR OF SAID WILLIAM SHIRLEY JACO, DECEASED

SEAL FOR SHAFT BEARINGS

Application filed August 7, 1928. Serial No. 298,027.

This invention relates to an improved seal which is particularly intended for high speed shafts on machines using gas, steam, or air, where it is necessary to prevent escape past shaft bearings of gas, steam or air at high pressure as it is not infrequent that the pressure in a machine of the character of which my invention particularly applies, may reach 500 pounds.

A practical embodiment of the invention comprises a cone bearing for the shaft, a plurality of split, nested cone shaped thimbles receiving said cone bearing, an expansible and contractible shell, and a spring for holding the thimbles on the cone shaped bearing, the entire system, except the cone bearing, being carried by the shaft and rotating with it. The cone shaped thimbles are ground to fit each other and to fit the cone to form an air, steam, or gas tight joint.

In the accompanying drawings:

Figure 1, is a sectional view;

Fig. 2, is an end elevation, the shaft being in section;

Fig. 3, is a detail view of the cone bearing and the cones, showing how they are arranged for assembly; and Figs. 4 and 5, are opposite views of the cone shaped thimbles.

A part of the machine having the bearing for the shaft 1 is shown at 2.

Suitably secured to the machine frame or bearing 2 is a cone bearing 3 comprising a disc suitably fitted to the bearing 2 and a cone against which bear the cone shaped thimbles now to be described.

A series of cone shaped thimbles, say three in number, are shown at 4, 5, 6. Each thimble is provided with slits 7 and the thimbles have ground inner and outer faces. They are nested as shown in Figs. 1, 3 and 5. The cone 3 has a ground surface where the innermost thimble 4 bears on it. The cone thimbles are split so that they will more perfectly engage each other and make a tight joint between themselves and between the innermost thimble and the cone 3 to prevent the escape of air, gas or steam from the machine on which the bearing is used.

The cone thimble 6 is connected to a cone shaped housing 8 by a ring 9, the joint being brazed or soldered. The housing 8 is soldered or brazed to a ring 10.

An expansible and contractible bellows-like shell 11 is brazed or soldered to the housing 8 or to the ring 10 as may be preferred. This shell 11 is also brazed or soldered to a collar 12 which is positively connected to shaft 1 by a pin 13 passed through the hub of said collar. An expansible coil spring 14 surrounds the shell 11 and bears against the collar 12 and the ring 10. The spring 14 presses the ring 10 and housing 8 toward the main bearing and, through the joint 11, forces the outermost cone thimble 6 against the thimble 5 and holds the latter against the thimble 4, which is thus pressed against the cone bearing 3 making an air, gas and steam tight joint.

It will be understood that the collar 12, shell 11, spring 14, ring 10, housing 8, ring 9, and cone thimbles 6, 5, 4, rotate as a unit with the shaft 1.

What I claim is:

1. In a seal for shaft bearings, the combination with a shaft, of a bearing cone, a bearing thimble into which the bearing cone projects said thimble and cone being relatively rotatable, a housing connected to said thimble, a ring to which the housing is connected, an expansible and contractible shell connected to the ring, a collar connected to the shell and to the shaft, and an expansible coil spring bearing on the collar and the ring and encircling the said shell, and means for relatively rotating said thimble and cone.

2. In a seal for shaft bearings, the combination with a shaft, and a bearing cone, of a plurality of rotatably mounted nested conical thimbles, the innermost one of which is rotatable on the cone bearing, and spring pressure means co-operating with said thimbles to keep them co-operatively related to each other and to the cone while they are rotating on the cone.

3. In a seal for shaft bearings, the combination with a shaft, and a bearing cone which is stationary in relation to the shaft, of a plurality of rotatably mounted nested conical thimbles, the innermost one of which engages the cone bearing, a rotary housing connected to one of said thimbles and enclosing all of them, spring pressure means co-operating with the housing, whereby the thimbles are held in co-operative relationship to each other and to the bearing cone, and means connecting the housing to the shaft, whereby the housing and thimbles rotate with the shaft and turn in respect to the stationary cone.

4. In a seal for shaft bearings, the combination with a bearing cone, of a plurality of nested, independent, split conical thimbles engaged with each other and the innermost one of which engages the bearing cone, a housing connected to one of the thimbles, a coil spring encircling the shaft and the cone and thimbles and co-operating with the housing, a bellows-like expansible and contractible shell contained within the coil spring and co-operating with the housing, and a collar secured to the shaft, said spring and shell co-operating with said collar, whereby the pressure is maintained on the housing to hold the thimbles in co-operative relationship to the cone.

In testimony whereof I affix my signature.

ALBEON BEASLEY.